United States Patent [19]

Meyer et al.

[11] 3,709,481

[45] Jan. 9, 1973

[54] DOCUMENT FEEDER

[75] Inventors: Alton H. Meyer, Austin; William C. Monday, Garland, both of Tex.

[73] Assignee: Recognition Equipment Incorporated, Irving, Tex.

[22] Filed: July 2, 1971

[21] Appl. No.: 159,141

[52] U.S. Cl. ................................................271/30 A
[51] Int. Cl. ................................................B65h 3/08
[58] Field of Search...................271/30 A, 28, 26, 27

[56] References Cited

UNITED STATES PATENTS

| | | | |
|---|---|---|---|
| 2,444,504 | 7/1948 | Grogan | 271/30 A |
| 3,313,537 | 4/1967 | Garwood | 271/30 A |

*Primary Examiner*—Evon C. Blunk
*Assistant Examiner*—Hadd S. Lane
*Attorney*—Richards, Harris & Hubbard

[57] ABSTRACT

In a document feeder, documents are urged upwardly in a tray under the control of a photoelectric servo system. A shuttleplate having vacuum ports formed in it is mounted at the upper end of the tray, and a vacuum is maintained in the vacuum ports so that the uppermost document from the tray is engaged with the shuttleplate by vacuum attraction. Upon demand, the shuttleplate is reciprocated initially upwardly to clear the uppermost document from the tray over an upstanding lip. Then the shuttleplate is reciprocating downwardly to transport the document into engagement with sets of pinch rollers. As the document engages the pinch rollers, a document release member that normally overlies the shuttleplate is rocked outwardly to disengage the document from the shuttleplate.

24 Claims, 4 Drawing Figures

INVENTORS:
ALTON H. MEYER
WILLIAM C. MONDAY

Richards, Harris & Hubbard
ATTORNEYS

INVENTORS:
ALTON H. MEYER
WILLIAM C. MONDAY

Richards, Harris & Hubbard
ATTORNEYS

INVENTORS:
ALTON H. MEYER
WILLIAM C. MONDAY

Richards, Harris & Hubbard
ATTORNEYS

INVENTORS:
ALTON H. MEYER
WILLIAM C. MONDAY

Richards, Harris & Hubbard
ATTORNEYS

DOCUMENT FEEDER

BACKGROUND AND SUMMARY OF THE INVENTION

This invention relates to automatic optical character recognition systems, and more particularly to an improved high speed document feeder for use in automatic optical character recognition systems.

Modern optical character recognition systems are designed to automatically read characters from documents that vary markedly in size. For example, such a system may be capable of reading data from 8 ½ by 11 inches type written sheets each bearing 60 or more full width type written lines. At the other extreme, the system may also be capable of reading small credit card type documents each bearing only one line of information. It will be appreciated that the documents that are read by optical character recognition systems also vary in thickness and weight, from relatively thin, flexible sheets to relatively thick, rigid cards.

The present invention comprises a document feeder for automatic character recognition systems which is capable of operating at the various demand rates required by such a system, and which accommodates documents of various sizes, thicknesses, and weights. In accordance with the preferred embodiment of the invention, a vacuum shuttleplate is reciprocated between a document receiving position wherein it receives the uppermost document in a document tray, and a document releasing position, wherein it releases the document to a document transport mechanism. At the releasing position, a document release member is reciprocated outwardly from the shuttleplate to disengage the document therefrom. Preferably, the density of the documents in the portion of the tray adjacent the shuttleplate is controlled by a photoelectric servo system.

BRIEF DESCRIPTION OF THE DRAWINGS

A more complete understanding of the present invention may be had by referring to the following Detailed Description when taken in conjunction with the accompanying drawings, wherein.

DETAILED DESCRIPTION

Figure 1:
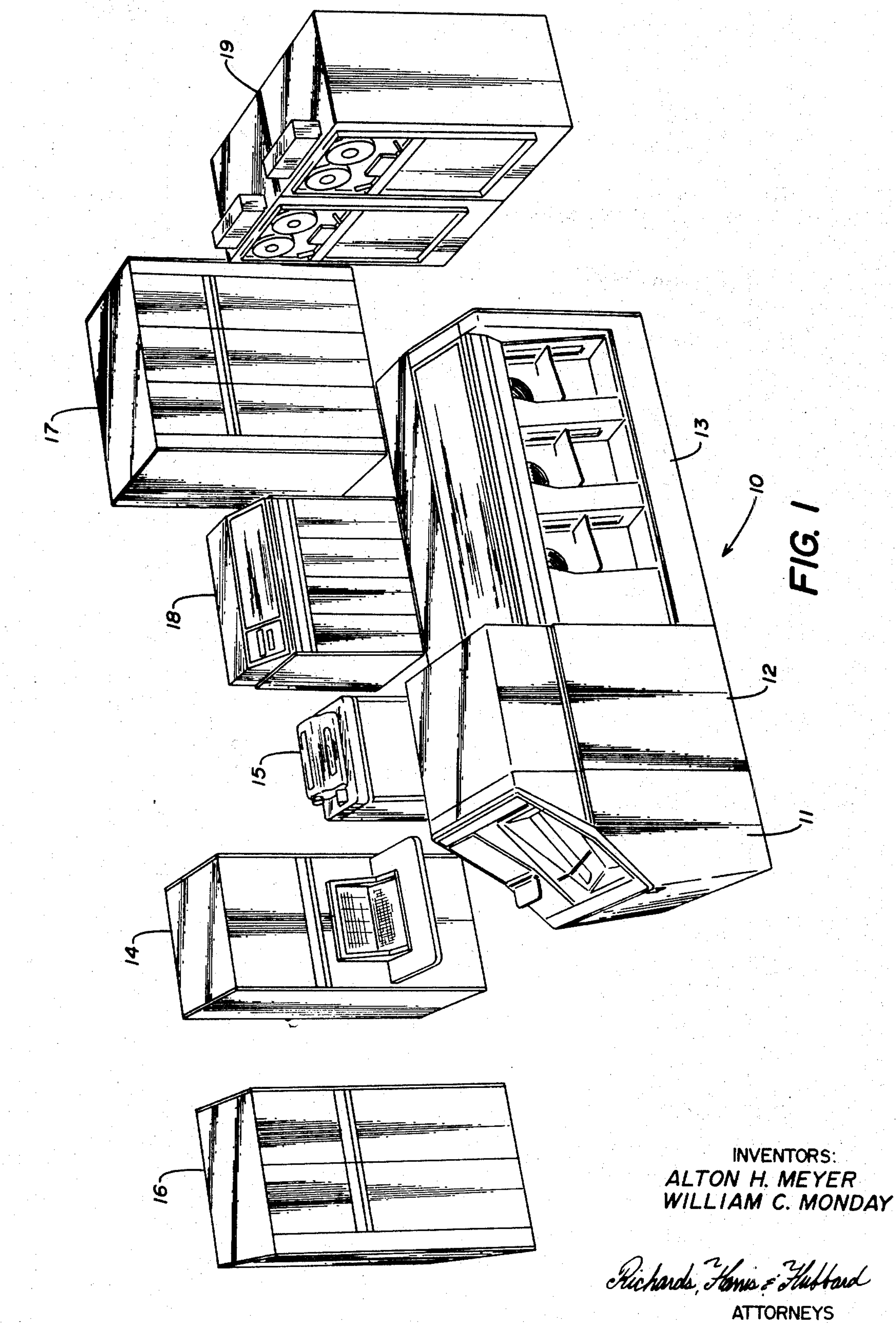
FIG. 1 is an illustration of an optical character recognition system including a document feeder constructed in accordance with the present invention.

Referring now to FIG. 1, an optical character recognition system includes a page processor 10 that is employed for the feeding, scanning and stacking of documents. The page processor 10 comprises a document feeder unit 11 which forms the subject matter of the present invention, a transport-scanning unit 12 and a stacking unit 13. Peripheral equipment to the optical character recognition system comprises a control console 14, an I/O unit 15, a peripheral control unit 16, a recognition unit 17 including logic circuitry for the recognition of characters of fixed fonts as well as characters of handprint execution, a line printer 18, and a tape transport unit 19.

The optical character recognition system shown in FIG. 1 has the capability of accepting 9 by 14 inches documents bearing single spaced, full width lines, and reading and completely transferring to storage, or to the line printer 18, or to the tape transport 19, all of the information on such documents at a rate of up to 30 pages per minute. On the other hand, credit card type documents wherein reading is restricted to one or two lines can be processed at a rate of up to 300 cards per minute. The system operates by receiving a stack of documents to be read in a tray of the feeder unit 11, feeding the documents one at a time into the transport-scanning unit 12 and then delivering the documents to the stacking unit 13 wherein stacking may be selectively dependent upon coded information on the documents themselves.

Figure 2:
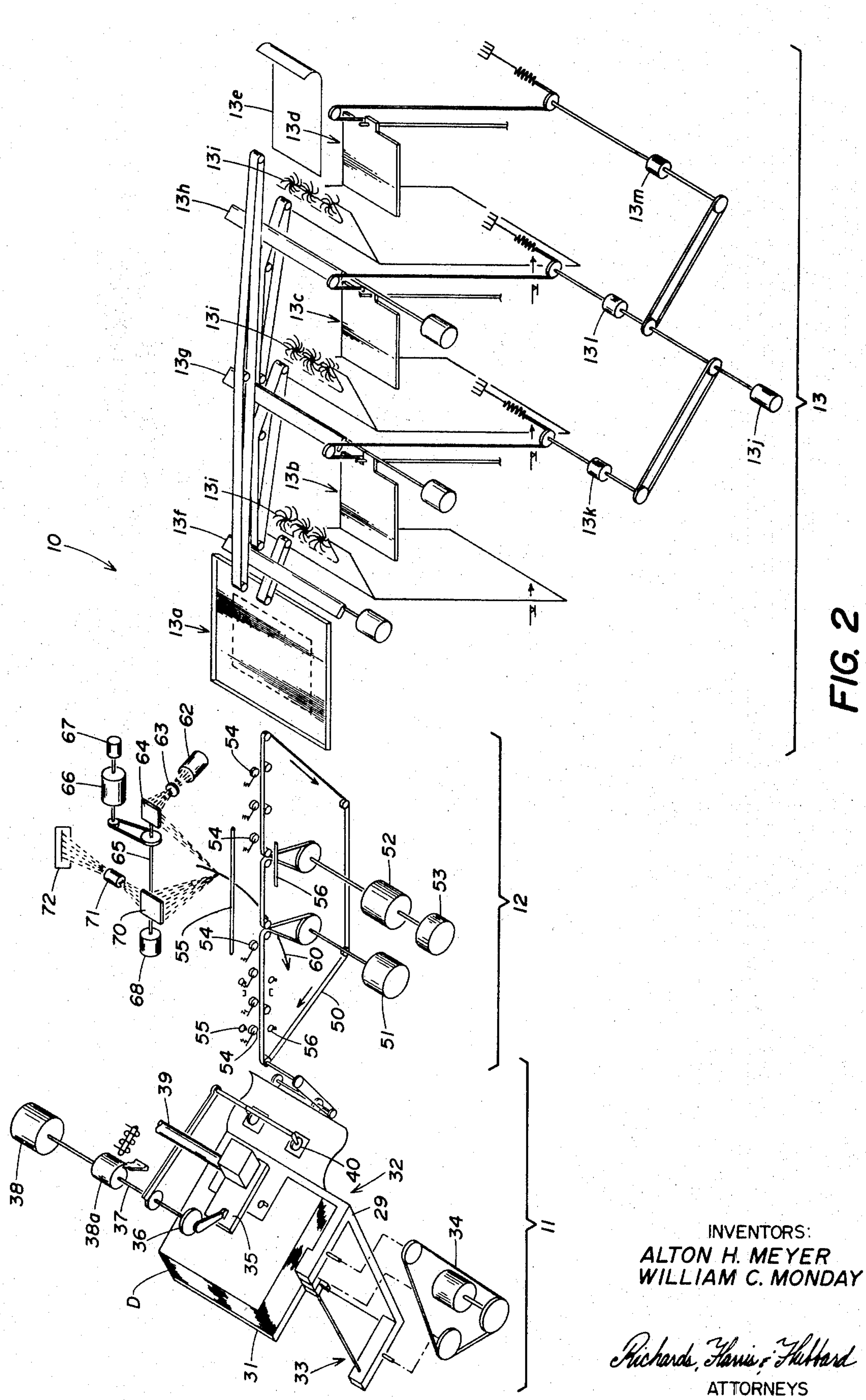
FIG. 2 is a diagrammatic view of the mechanical components of a page processor comprising a portion of the optical character recognition system shown in FIG. 1.

The construction and operation of the optical character recognition system will be better understood by referring to FIG. 2, wherein the mechanical components of the page processor 10 are schematically illustrated. The document feeder unit 11 of the page processor comprises a tray 29 that receives a stack of documents D. A paddle 31 advances the stack of documents D toward a shuttleplate unit 32. The paddle 31 is servo driven through a linkage 33 and a chain 34 to maintain a predetermined density in the portion of the stack of documents D located adjacent the shuttleplate unit 32.

Upon actuation of a single revolution clutch 38*a*, a motor 38 reciprocates a shuttleplate 35 through a crank 36 mounted on a shaft 37. The shuttleplate 35 has a plurality of apertures formed through it. A vacuum is maintained in the apertures through a vacuum system connected to an exhaust pipe 39. By this means, individual documents are sequentially removed from the stack D and are moved downwardly into engagement with a set of pinch rollers that are diagrammatically represented at 40.

The pinch rollers 40 direct each document into the document transport scanning unit 12 wherein the document is advanced by a belt 50 that is driven by a pair of servo motors 51 and 52 in response to a position encoder 53 and a suitable control system. Documents are maintained in contact with the belt 50 by a series of rollers 54 as well as by jets of air that are directed downwardly from parallel tubes 55 and 56 positioned above and on opposite sides of the belt 50. In the region of arc 60, the documents are drawn into a fixed position against a bedplate by a plurality of vacuum ports (not shown). Arc 60 represents the scan location of documents traveling under the action of the belt 50, and the arrow 59 represents the direction of line length of information printed on the documents.

At the scan location, light from a high intensity lamp 62 passes through a lens system 63 onto an oscillating mirror 64 and is projected and focused onto a scan point on arc 60. The mirror 64 is mounted on a shaft 65 that is driven by a servo motor 66 having a servo tachometer 67 associated therewith and an encoder 68 responsive to the movement of the shaft 65. A scanning mirror 70 is mounted on the shaft 65 for oscillation with the mirror 64. Light reflected from the mirror 70 passes through a lens system 71 onto a columnar retina 72. In one embodiment of the system, the retina 72 is provided with 96 active cells and is operated such that characters viewed by the retina as the light beam sweeps arc 60 actually fall on or energize 16 cells for a normal character, i.e., a character of usual type print height. The remainder of the cells of the retina are employed in the system for locating the next line to be scanned and for providing control signals to the servo motors 51 and 52, whereby the document is properly positioned for the initiation of the scan of the next line.

Once scanned, each document is fed to a rest station 13*a* at the input of the stacker unit 13. The movement of the document is arrested at the rest station to permit the stacker unit to respond to control instructions. Then, in accordance with such control instructions, the document is delivered, either to a selected one of three bins 13*b*, 13*c*, and 13*d*, or to a reject bin 13*e*. The movement of documents in the stacker unit 13 is under the control of stacker gates 13*f*, 13*g*, and 13*h*, and spiral stacking wheels 13*i* are employed to deliver documents to the selectable bins 13*b*, 13*c*, and 13*d*.

In order to accommodate documents of different weights, positive control is provided through a stacker motor 13*j* operating through clutches 13*k*, 13*l*, and 13*m* to maintain the top of the stack of the documents in each bin 13*b*, 13*c*, and 13*d*, respectively, in a predetermined relation to the periphery of the spiral stacking wheels 13*i*. In each bin, the document level is sensed to control the respective clutches 13*k*, 13*l*, and 13*m*.

From the foregoing, it will be understood that the page processor 10 of the optical character recognition system is not restricted to reading documents of a particular type, but rather is capable of reading a wide variety of document formats. That is, within the physical limitations of the various components of the page processor 10, the optical character recognition system is capable of reading documents of various sizes and upon which information is arranged in any convenient number of lines. To this end, the document feeder unit 11 of the page processor 10 must be capable of feeding documents of various sizes, and must be capable of feeding documents of various thicknesses and weights, whereby upon demand, the uppermost document from the tray is fed into the transport-scanning unit 12 of the page processor 10.

Figure 3:
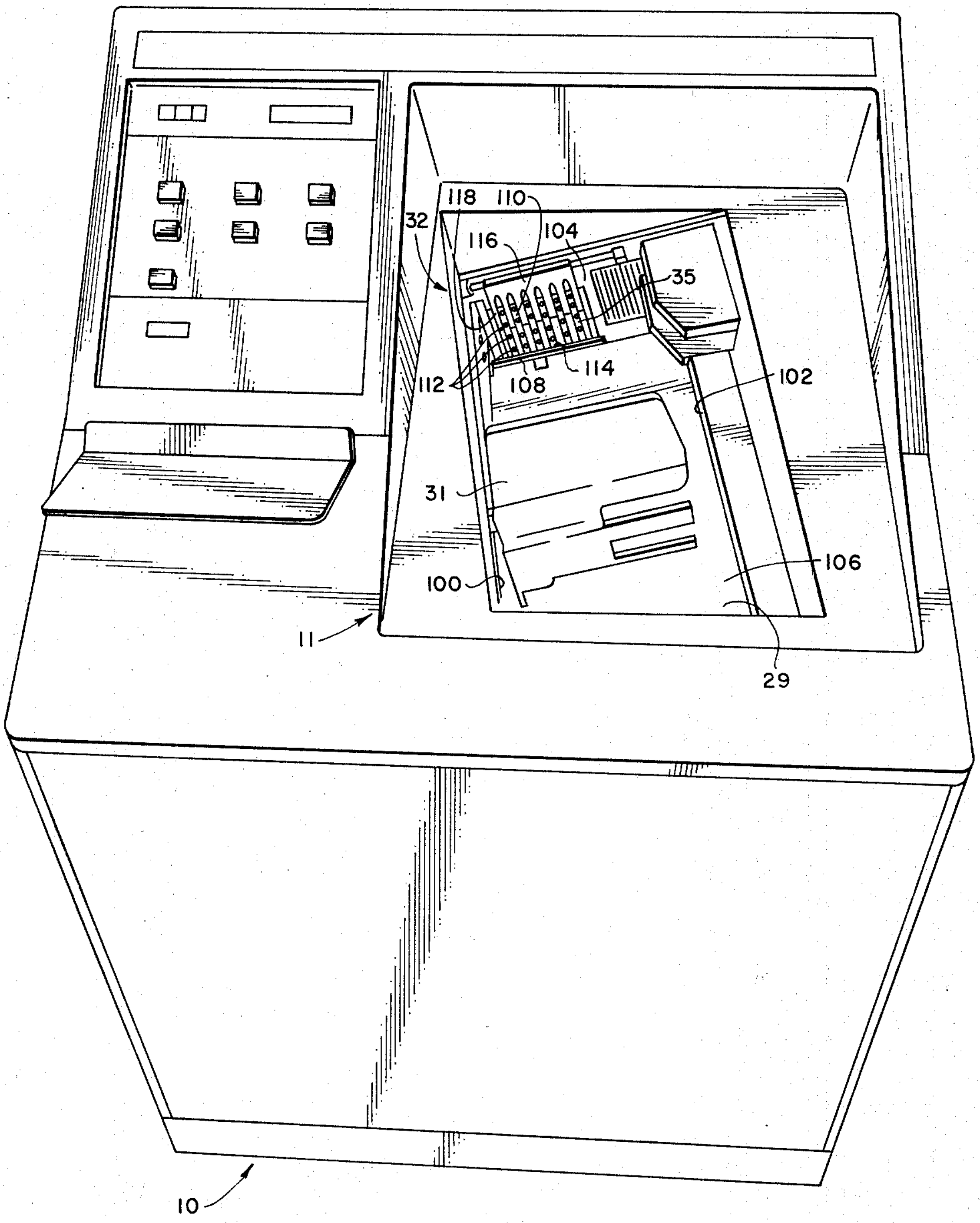
FIG. 3 is a front view of the page processor showing the document feeder unit thereof.

Referring now to FIG. 3, structural details of the document feeder unit 11 are shown. The tray 29 has opposed side walls 100 and 102, an end wall 104, and a floor 106 which slopes upwardly from a lowermost lower lefthand corner. By this means, documents positioned in the tray 29 are urged into engagement with the floor 106 and the side wall 100 under the action of gravity.

The paddle 31 urges a stack of documents positioned in the tray 29 upwardly across the floor 106 toward a lip 108 that projects upwardly from the floor 106 adjacent the shuttleplate 35. A photoelectric servo system including a lamp positioned behind the side wall 102 and a photocell positioned behind the side wall 100 regulates the movement of the paddle 31 and thereby prevents excessive crowding of the documents in the portion of the tray adjacent the shuttleplate 35. Also, air jets are directed inwardly from the side walls 100 and 102 to establish and maintain a predetermined degree of separation between the end documents in the tray 29.

The shuttleplate 35 comprises a plurality of ribs 110 that project toward the paddle 31. Each rib 110 has a plurality of vacuum ports 112 formed through it. A vacuum is maintained in each port 112 and, accordingly, as a stack of documents is moved toward the shuttleplate 35 by the paddle 31, the upper portion of the uppermost document in the stack is drawn into engagement with the shuttleplate 35 by vacuum attraction, whereas the lower portion of the uppermost document is restrained by the lip 108.

Whenever the next document from the tray 29 is demanded by the transport-scanning unit 12 of the page processor 10, the shuttleplate 35 is reciprocated initially upwardly to lift the lower edge of the end document in the tray over the lip 108, whereupon the lower portion of the document is drawn into engagement with the shuttleplate 35 by vacuum attraction. This separates the end document from the rest of the documents in the tray and thereby prevents the feeding of two documents at once. The shuttleplate 35 is then reciprocated downwardly to move the document into a slit 114 between the back of the lip 108 and the face of the shuttleplate 35 and into engagement with the pinch rollers 40 shown in FIG. 2.

Referring again to FIG. 3 a document release member 116 includes a plurality of fingers 118 that are normally interleaved with the ribs 110 of the shuttleplate 35. As the shuttleplate 35 is reciprocated downwardly to move the document into engagement with the pinch rollers, the document release member 116 is rocked outwardly from the shuttleplate 35 to disengage the document therefrom. This permits the pinch rollers to grasp the document and advance it into the transport-scanning unit 12 of the page processor 10. The document release member 116 and the shuttleplate 35 are then returned to the normal positions shown in FIG. 3, whereupon the document feeder unit 11 is ready to feed another document from the tray 29 into the page processor 10.

Figure 4:
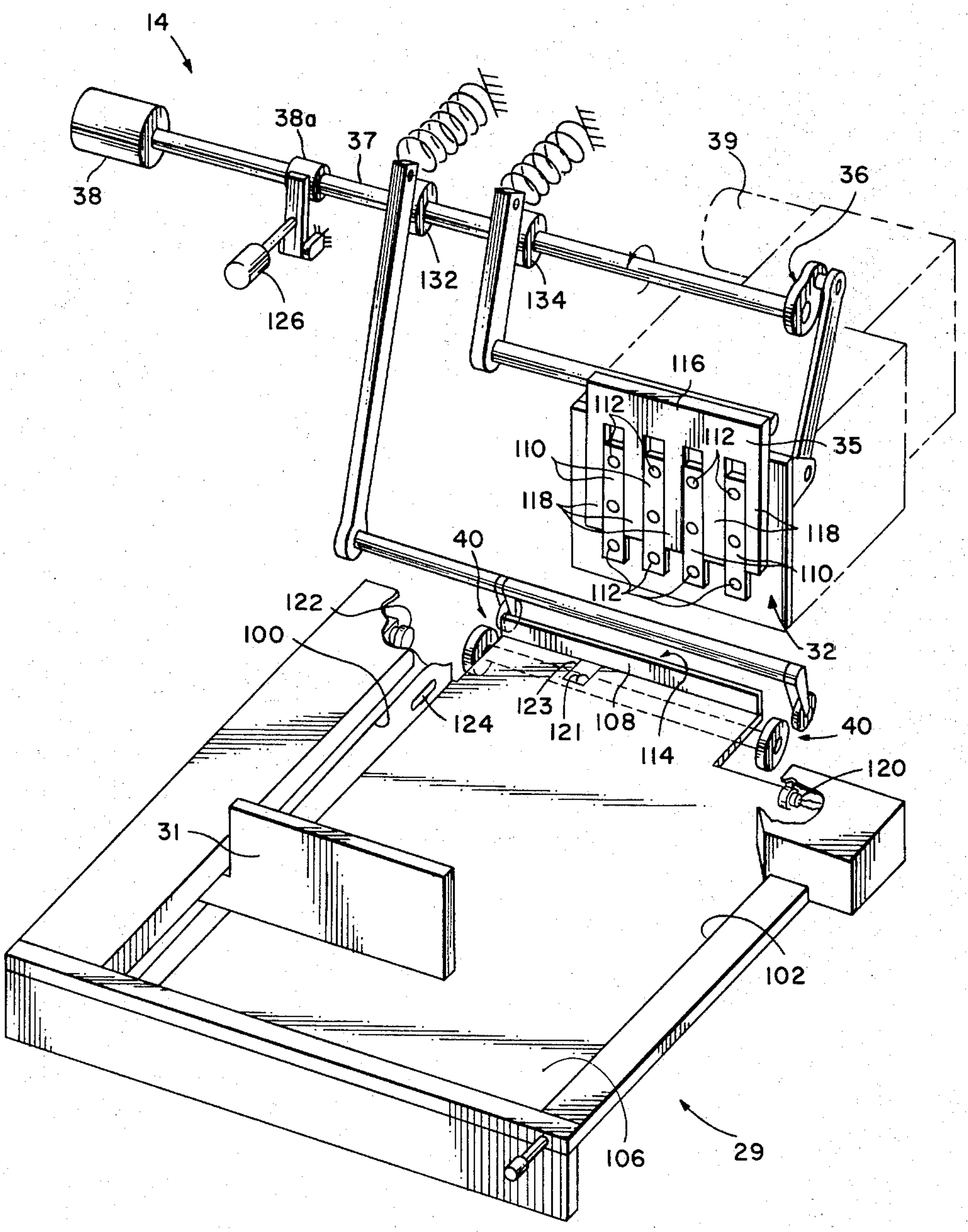
FIG. 4 is a schematic illustration of operating components of the document feeder unit.

The operation of the document feeder unit 11 will be better understood by referring to FIG. 4 wherein the various operating components of the device are schematically illustrated. A lamp 120 positioned behind the side wall 102 directs light across the tray 29 in a direction extending perpendicular to the direction of movement of the paddle 31 to a photocell 122 positioned behind the side wall 100. The photocell 122 controls a conventional servo circuit (not shown) which advances the paddle 31 toward the shuttleplate 35 whenever the photocell 122 receives light from the lamp 120 and which arrests the movement of the paddle 31 toward the shuttleplate 35 whenever the photocell 122 does not receive light from the lamp 120. A lamp 121 below the floor of the tray 106 is provided to direct light across the corner of the document stack through a slot 123 to energize the photocell 122. This makes certain that the document feed continues even though bent or curved documents stop the light from the lamp 120 before the document density at the end of the tray is at the desired level. Thus, the density of the documents in a stack of documents positioned in the tray 29 is controlled to assure the positioning of the uppermost document on the stack in engagement with the shuttleplate 35 and yet prevent overcrowding of the documents in the stack. Separation of the documents in the stack is further assured by air jets directed across the tray 29 through an aperture 124 formed in the side wall 100 and a like aperture (not shown) in the side wall 102.

Whenever the transport-scanning unit 16 of the page processor 10 is in condition to accept a document, a signal is transmitted to a solenoid 126. The solenoid 126 actuates the single revolution clutch 38*a*, whereupon power is transferred from the motor 38 to a shaft 37 and the shaft is rotated through a single revolution. The shaft 37 rotates the crank 36, which is arranged to reciprocate the shuttleplate 35 initially upwardly to clear a document over the lip 108 and then downwardly to deliver the document to the normally open pinch rollers 40 positioned at the lower end of the slit 114. As the crank 36 nears bottom dead center, a cam 132 on the shaft 37 closes the pinch rollers 40 to grip the document therebetween. At the same time, a cam 134 on the shaft 37 pivots the document release member 116 outwardly, whereupon the fingers 118 disengage the document from the shuttleplate 35. During the latter portion of the rotation of the shaft 37, the crank 36 and the cams 132 and 134 return the component parts of the document feeder unit 11 to the condition shown in FIGS. 3 and 4.

The use of the document feeder illustrated in the drawings results in numerous advantages over the prior art. First, because of the inclination of the floor 106 of the tray 29, documents in the tray 29 are urged into the corner between the side wall 100 and the floor 106 under the action of gravity. The shuttleplate 35 is positioned in the upper left hand corner of the floor 106, i.e., at the upper end of the corner between the floor 106 and the side wall 100. Thus, the shuttleplate 35 is in position to receive documents from the tray 29 over a wide range of sizes of documents. Second, because documents are removed from the tray 29 by the shuttleplate 35 under vacuum attraction, and due to the action of the lip 108 in separating the uppermost document in the tray from the remaining documents therein, a feed of only one document at a time is assured. Third, the stripping action afforded by the document release member 116 permits the use of sufficient vacuum to lift and transport relatively heavy documents while also minimizing the danger of tearing or damaging relatively thin documents when they are received by the pinch rollers. The latter feature is also advantageous in that it eliminates the necessity of providing valving for the vacuum in the vacuum ports 112 of the shuttleplate 35 which has characterized most prior document feeders. Fourth, the use of a photoelectric servo system to control the operation of the paddle assures the positioning of the uppermost document in the tray in engagement with the shuttleplate, and yet prevents overcrowding of the documents in the tray in the region adjacent the shuttleplate.

From the foregoing, it will be understood that the present invention comprises a document feeder including a vacuum shuttleplate for moving individual documents between a document tray to a document transport mechanism, and a document release member for disengaging documents from the shuttleplate. As previously indicated, document feeders employing the invention are capable of feeding documents of various sizes, thicknesses and weights at various feed rates. Thus, the document feeders employing the present invention are well adapted for use in automatic optical character recognition systems.

Although the preferred embodiment of the invention has been illustrated in the drawings and described in the foregoing specification, it will be understood that the invention is not limited to the embodiment disclosed, but is capable of rearrangement, modification and substitution of parts and elements without departing from the spirit of the invention.

What is claimed is:

1. A feeder for grasping and transporting a document at the end of an edge supported document stack in a feed tray which comprises:

a. a movable shuttleplate at a rest position at the end of said tray having a perforate face confronting said document;

b. vacuum means flow connected to said face to force air flow through perforations therein for grasping and adhering said document to said face;

c. means for moving said plate away from the rest position to remove said document from said stack; and d. release means in said face actuated to protrude from said face to release said document from said plate in synchronization with movement of said plate from the rest position.

2. The document feeder according to claim 1 further including a document transport mechanism positioned to receive said document from the shuttleplate upon operation of the release means.

3. The document feeder according to claim 2 wherein the document transport mechanism includes opposed, normally open pinch rollers for receiving documents from the shuttleplate and means for closing the pinch rollers in sychronism with the movement of the shuttleplate to the document releasing position.

4. The document feeder according to claim 1 further including:

means for urging a stack of documents toward the shuttleplate, and an upstanding lip positioned adjacent the shuttleplate in the path of the urging means for cooperation with the shuttleplate to separate the uppermost document in the stack from the remaining documents therein.

5. The document feeder according to claim 4 wherein the shuttleplate reciprocating means initially reciprocates the shuttleplate upwardly to clear the uppermost document in the stack over the upstanding lip and then reciprocates the shuttleplate downwardly to transport the document to the document releasing position.

6. In a document feeder of the type including a tray for receiving a stack of documents and a vacuum shuttleplate for moving individual documents from the tray into engagement with a document transport mechanism, the improvement comprising:

a document release member normally overlying the shuttleplate and means for moving the release member outwardly of the shuttleplate to disengage a document therefrom when the document is engaged with the document transport mechanism.

7. The improvement according to claim 6 wherein the shuttleplate is further characterized by a plurality of ribs each having a plurality of vacuum ports formed through it and wherein the release member is further characterized by a plurality of release fingers each normally positioned between two of the ribs of the shuttleplate.

8. The improvement according to claim 6 wherein the document transport mechanism comprises normally open pinch rollers and further including means for closing the pinch rollers to grip a document therebetween in sychronism with the movement of the release member to disengage the document from the shuttleplate.

9. The improvement according to claim 8 further characterized by a common drive mechanism for reciprocating the shuttleplate between the document receiving and document releasing positions, for moving the release member outwardly of the shuttleplate in sychronism with the reciprocation of the shuttleplate to the release position, and for simultaneously closing the pinch rollers.

10. The improvement according to claim 6 further characterized by an upstanding lip formed on the tray adjacent the shuttleplate, and wherein the shuttleplate reciprocates each document from the stack over the upstanding lip to separate the document from the remainder of the stack.

11. A document feeder comprising:

a document tray extending to an upstanding lip;

a shuttleplate positioned adjacent to and spaced from the lip to define a document receiving slit therebetween and having vacuum ports formed through it;

means for maintaining constant vacuum in the vacuum ports of the shuttleplate;

a document release member normally positioned to permit the engagement of documents from the tray with the shuttleplate under vacuum attraction;

means for reciprocating the shuttleplate initially upwardly to clear the document from the tray over the upstanding lip and then downwardly to move the document into the slit, and means for subsequently moving the document release member outwardly of the shuttleplate to disengage the document therefrom.

12. The document feeder according to claim 11 further including normally open pinch rollers for receiving the documents from the shuttleplate and means for closing the pinch rollers into engagement with a document upon movement of the document into the slit by the shuttleplate.

13. The document feeder according to claim 12 further including means for sychronizing (a) the reciprocation of the shuttleplate to move a document into the slit, (b) the closure of the pinch rollers to receive the document from the shuttleplate, and (c) the movement of the release member outwardly of the shuttleplate to disengage the document from the shuttleplate.

14. The document feeder according to claim 11 further including means for moving a stack of documents relative to the tray toward the shuttleplate, and servo means for controlling the movement of the document moving means in accordance with the density of the documents with the stack.

15. The document feeder according to claim 14 wherein the servo means includes means for directing a light beam across the tray perpendicular to the direction of movement of the stack of documents, photosensitive means for receiving light from the light directing means, and means for controlling the movement of the document moving means in accordance with signals generated by the photosensing means.

16. In a document feeder of the type including a document tray, a paddle for advancing a stack of documents in the tray, a vacuum shuttleplate for removing individual documents from the stack, and a transport mechanism for receiving documents from the shuttleplate, the improvement comprising:

lamp means for directing a light beam across the tray;

photosensitive means responsive to light from the lamp means for generating a signal indicative of the density of documents in the stack, and servo means for controlling the operation of the paddle in accordance with the signal generated by the photosensitive means.

17. The improvement according to claim 16 wherein lamp means directs dual light beams across the portion of the tray located adjacent the shuttleplate, one in a direction extending perpendicular to the direction of movement of the paddle and the other in a direction extending angularly from a point in the tray adjacent the shuttleplate.

18. The improvement according to claim 16 wherein the servo means advances the paddle toward the shuttleplate whenever the photosensitive means generates a signal indicative of the receipt of light from the lamp means.

19. The improvement according to claim 16 wherein the lamp means directs light beams across the portion of the tray adjacent the shuttleplate and in directions extending perpendicular to the direction of movement of the paddle and angularly from a point in the tray adjacent the shuttleplate, wherein the photosensitive means generates two signals, one indicative of the receipt of light from the lamp means and the other indicative of the non-receipt of light from the lamp means, and wherein the servo means advances the paddle toward the shuttleplate in response to signal from the photosensitive means indicative of the receipt of light and arrests the movement of the paddle toward the shuttleplate in response to a signal from the photosensitive means indicative of the non-receipt of light.

20. A document feeder comprising:

a. tray means for receiving and providing edge support for upstanding documents and having a low lip at one end thereof;

b. means for urging said documents along said tray toward an outlet slot at said end of said tray adjacent said lip;

c. a reciprocating plate at said end of said tray having ports in the face thereof confronting said documents;

d. vacuum means for drawing air through said ports to attract and adhere the end document to said face;
e. cylic drive means to reciprocate said plate and thereby move said end document first upwardly over said lip and then downwardly through said slot;
f. gripping rollers below said slot to grip and propel said document in a direction aligned with the plane of said face; and
g. release bars in the face of said plate actuated to protrude from said face in timed relation to delivery of said document to said gripping rollers to break the hold on said document by said vacuum means.

21. The document feeder according to claim 20 further including photoelectric means for controlling the operation of the document urging means to maintain a predetermined document density in the portion of the tray means adjacent the slot and the lip.

22. The document feeder according to claim 20 further including means for directing air across the portion of the tray means adjacent the slot and the lip and thereby maintaining separation between documents in the tray means.

23. The document feeder according to claim 20 wherein the reciprocating plate comprises a plurality of ribs which project outwardly toward the document, wherein the ports are formed in the ribs, and wherein the release bars are normally positioned between the ribs.

24. The document feeder according to claim 20 wherein the gripping rollers are normally open to receive a document and further including means for synchronizing the operations of the drive means and the release means and the closing of the gripping rollers to move a document from the tray means over the lip, through the slot and into engagement with the gripping rollers.

* * * * *